2 Sheets—Sheet 1.

J. STEPHENSON.
CAR LAMP-HOUSE.

No. 190,259. Patented May 1, 1877.

Witnesses.
L. Van Riswick
D. G. Stuart

Inventor.
John Stephenson.
per F. Hannay
atty.

N. PETERS, PHOTO-LITHOGRAPHER, WASHINGTON, D. C.

2 Sheets—Sheet 2.

J. STEPHENSON.
CAR LAMP-HOUSE.

No. 190,259. Patented May 1, 1877.

UNITED STATES PATENT OFFICE.

JOHN STEPHENSON, OF NEW YORK, N. Y.

IMPROVEMENT IN CAR-LAMP HOUSES.

Specification forming part of Letters Patent No. 190,259, dated May 1, 1877; application filed January 5, 1877.

*To all whom it may concern:*

Be it known that I, JOHN STEPHENSON, of New York, in the county of New York and State of New York, have invented certain new and useful Improvements in Car-Lamp House; and I do hereby declare that the following is a full, clear, and exact description thereof, which will enable others skilled in the art to which it appertains to make and use the same, reference being had to the accompanying drawings, and to letters of reference marked thereon, which form a part of this specification, in which—

Figure 1:
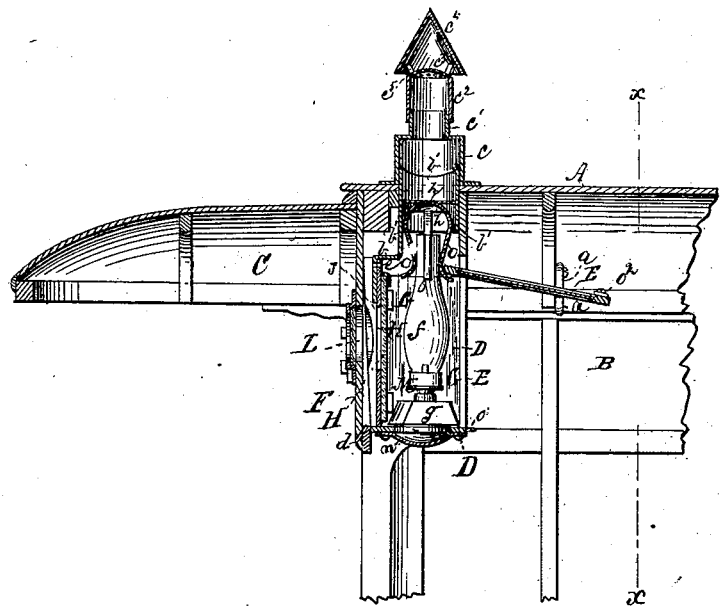
Figure 2:
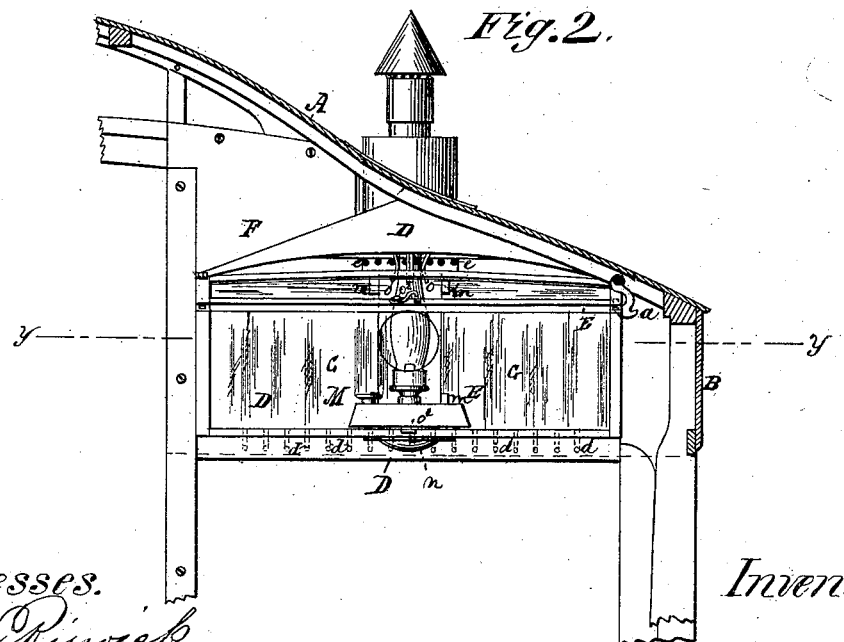
Figure 3:
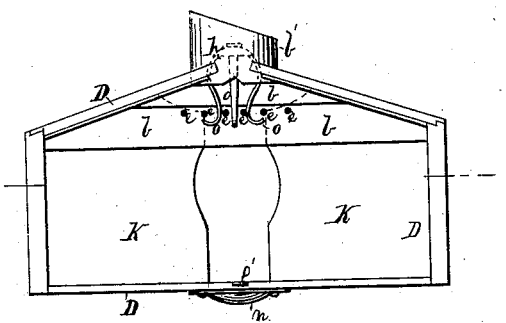
Figure 4:
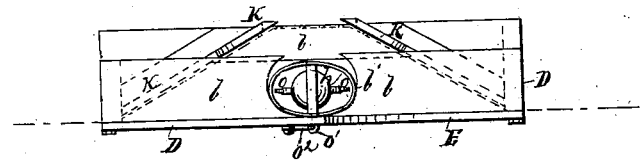
Figure 5:
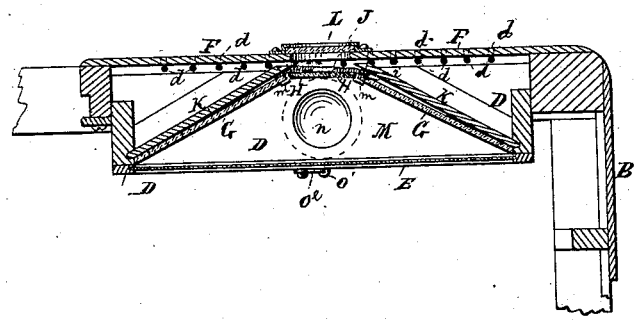

Figure 1 represents a vertical longitudinal section of a portion of the end of a street-car, taken through its lamp-house, and to which my improvements have been applied. Fig. 2 represents a vertical transverse section taken through the line $x\,x$, Fig. 1. Fig. 3 represents a front elevation of the lamp-house detached from the car, the door, lamp, and reflectors being removed; and Fig. 4, a plan of the same. Fig. 5 represents a horizontal section of the lamp-house and that portion of the car to which it is attached, as taken through the line $y\,y$ of Fig. 2.

The lamp-houses of cars, as at present constructed, are imperfect in various respects, and give rise to many objectionable troubles, among which may be enumerated the following:

First, imperfect combustion of the lamp, caused by an insufficient supply of air thereto, and which arises from the fact that the lamp-houses, as now constructed, get their supply of air from the inside of the car, usually up through the bottom of the lamp-house by way of the enlarged hole in which the "well" or base of the lamp-bowl sits, or else through other holes expressly made for the purpose; or, as practiced in some cases, by leaving the lamp-house door slightly ajar.

At times, all of these methods prove inefficient, and always deleterious, from the fact that the progress of the cars—especially when the wind is ahead—tends to create a vacuum at its rear by exhausting the air from within the car, and hence preventing the necessary supply from passing into the lamp-house, and from thence into the lamp-burner and out at the smoke-stack. This exhaustion of the air, even in a slight degree, from within the car, tends to hold the atmosphere in the lamp-chamber in a state of equilibrium, thereby causing a failure of the needful supply to the lamp for effecting perfect combustion.

My remedy consists in furnishing the lamp with its needful supply of air for perfect combustion by means of an air duct or ducts, of any desirable form, leading from the atmosphere without the car to the inside of the lamp-house.

Secondly, liability of the lamp-flame to be extinguished. This trouble may arise not only from an insufficient supply of air to the flame, but also from a downward draft in the smoke-stack, induced by any cause whatsoever, and which frequently results in blowing out the lamp.

All efforts heretofore made, whether by smoke-jacks or other devices, to prevent the passage of downward currents of air through the smoke-stack and chimney, have proved unsuccessful, and necessarily must do so, so long as the air supplied to the lamp is furnished to it from the inside of the car, and for the reason that any exhaustion of air from the inside of the car must also exhaust or withdraw air from the inside of the lamp-house, and thereby induce a downward current or rush of air through the smoke-stack and lamp-chimney, and hence result, as before stated, in blowing out the lamp-flame.

To remedy this evil I sever all connection between the air in the lamp-house and the atmosphere in the car, and supply air to the former through ducts or openings, preferably arranged in the front end of the car, and which communicate directly with the outside atmosphere.

Thirdly, offensive odors within the car, arising from the evaporation of the oil used for producing the flame or light, and from the escape within the car of the products of combustion of the lamp.

This trouble is also remedied by closing all communication between the interior of the lamp-house and inside of the car, and supplying the lamp with fresh air, for the perfect combustion of the oil, directly from the external atmosphere.

Fourthly, dripping of oil from the lamp, which, falling upon passengers seated under the lamp-house, is very objectionable.

This I remedy by placing beneath the lamp a dish or other receptacle, into which the drippings fall. The dish also serves to cover the opening under the lamp, thereby preventing, through that opening, the passage of air from the lamp-house to the inside of the car, where it would otherwise mingle with the air within the car.

Fifthly, excessive heat in the lamp-house, which tends to damage the reflectors and fracture the glass of the lamp-house.

This I remedy in the same manner by supplying the lamp-house for the use of the lamp with a constant stream of cool air brought from the outside of the car, and, with this object in view, preferably conducting it to, and bringing it in contact with, the rear side of the reflectors, and thence to the lamp-chamber proper, whereby not only the glass which enters into the construction of the lamp-house, but the reflectors, are kept cool, and the wants of the lamp abundantly supplied.

Sixthly, lack of means for the retention of the lamp bowl and chimney in their proper place. It is a matter of experience that unless the lamp-bowl has a proper lodgment it will slide about by the jostling of the car, and thereby cause commotion in the oil of the lamp, and at the same time, where the upper end of the lamp-chimney is not maintained in its proper position by a holder, cause it to loosen and topple over.

To prevent the sliding about of the lamp-bowl I lodge its lower end or well in a niche or depression formed in the floor of the lamp-house, and then hold the upper end of the chimney steady by passing it between pendent fingers, or equivalent devices, attached in any suitable manner to the roof of the lamp-house, or to the frame-work of the smoke-stack, and that in such manner that the chimney may be freely manipulated, as desired.

This arrangement of the bottom of the lamp in a suitably-covered depression or air-tight concavity formed in the bottom of the lamp-house not only holds the lamp in place, but, by lowering its level, enables a chimney of proper length to be used on the lamp to insure perfect combustion—a point of great practical value, and of most difficult attainment, because of the lack of room to admit of suitable height in the lamp-chamber.

Seventh, lack of brilliancy in the night-signal. This arises from the lamp burning dimly, produced by imperfect combustion and consequent generation of smoke, caused by an irregular and insufficient supply of air to the lamp, for the reasons hereinbefore stated.

This is remedied by me through the instrumentality of the devices referred to—to wit, cutting off all communication between the interior of the lamp-house and the inside of the car, and opening up communication between the external air and the interior of the lamp-house, and which I prefer doing by the use of a series of air-ducts formed in the front end of the car, and which lead into the lamp-house immediately in rear of the reflectors, the immediate effect of which is to cause a perfect combustion of the oil in the lamp, thereby creating a brilliant flame, which, as is well known, can be seen much farther than a dull one, even through an ordinary glass, and is much intensified when used in connection with a lens.

Eighthly, lack of direct and of reflected light within the car. This is caused, principally, by the lamp burning dimly, resulting as well from imperfect ventilation as from imperfect combustion of the oil, the consequence being that both the glass and the reflectors are smoked up and tarnished, and thereby rendered incapable of reflecting or allowing free passage to the light, either through the glass plate to the signal-lens as a signal-light, or through the glass in front of the lamp-house, for the purpose of illuminating the inside of the car.

These are also remedied by the air-ducts, and by cutting off all communication between the lamp-house and inside of the car, as before described.

Ninthly, lack of suitable devices to prevent the descent of sudden gusts of wind down the chimney-stack, and which frequently extinguish the lamp-flame. This I remedy by arranging a shield of suitable form in the enlargement of the smoke-stack—as, for instance, a curved or dish-shaped shield having the convex side upward; and this may be supplemented by the application of a double cap-piece to the mouth of the smoke-stack, the lower cap being provided with a cover having a number of small holes, or else with wire-gauze, and the upper one made of a convex or conical shape, and arranged in a plane in a line with, or slightly above, the under one, and of a diameter greater than that of the latter, so as to shield and protect it from rain, &c., or the descent of a current of air from above.

Tenthly, lack of a suitable automatic device for supporting or holding the door open while the attendant is attending to the lamp.

The door in this kind of lamp-house is hung at the top, and, unless properly supported, interferes with the freedom of the hands in manipulating the lamp.

To supply this want I pivotally suspend from the rafter or other convenient place an S-shaped hook, the free lower end of which is so adjusted and constructed that when the door is opened (upward) its edge or "stile" will force backward the free end of the hook until it has passed above it, when the hook will then automatically return to receive and hold the door upon its upper end until designedly released.

To enable others skilled in the art to make, construct, and use my invention, I will describe its parts in detail.

In the drawings, which represent sectional views of the upper portion of the front end of a street-car and its lamp-house, and detail views of the same, A represents the roof, B the side wall, and C the canopy, of the car.

D represents the lamp-house as ordinarily arranged on the end of the car, near the roof, and on the inside, and in its general shape and construction resembles those in ordinary use.

In this class of lamp-houses the door E is hinged at its upper edge, so that in opening it to attend to the lamp its lower or free end must be raised upward. To facilitate the trimming, fixing, and cleaning of the lamp, the door should be held open by some automatic contrivance, which, when the door is raised, will adjust itself to keep the door in that position until designedly released, thereby saving time and trouble to the attendant.

To this end I loosely pivot an S-shaped hook, a, to the roof of the car, preferably to the side of one of the rafters.

This hook is so fashioned on its lower end that the raising of the door will force it aside out of its way until its "stile" has passed the point of the hook, when the hook, by its own gravity, will return or swing back, bringing its point immediately under the stile or side frame-piece of the door, thereby holding the latter in its elevated position until released by the attendant.

The roof of the lamp-house, on the inside, is protected from the heat of the lamp by a metal lining, b, the upper end of which terminates in a short smoke-stack, b', the upper end of which fits into the mouth or lower end of that portion, c, of the smoke-stack proper which passes through the roof of the car, and into the lamp-house, for the purpose of carrying off the products of combustion of the lamp.

The portions b' and c of the smoke-stack are made larger than the smoke-stack c' proper. To that portion of the smoke-stack, b', which is formed on the upper end of the lining b, on its inside, is secured a shield, h, of suitable form, and in any suitable and well-known manner.

This shield I prefer to make of a curved form, the upper being the convex side. To this shield I secure pendent elastic fingers o, of which there should be three, four, or more. Between these fingers the upper end of the lamp-chimney f is passed, when the lamp g is put in its place in the lamp-house.

The fingers o serve to steady the chimney, and prevent it from toppling over by the jostling of the car.

Instead of securing the elastic fingers o to the portion b' of the smoke-stack through the medium of the shield h, they may each be independently and directly secured thereto, and thus give a freer passage to the products of combustion from the lamp through the smoke-stack, should it be deemed advisable so to do.

In the back part of the lining b is pierced one or more series of small holes, e, at a point below the top of the chimney of the lamp. These openings e serve to admit air to the lamp-chamber M, as well for the use of the lamp as for the purpose of aiding in expelling the gases from the lamp-chamber up the smoke-stack.

The air for these purposes is admitted into the lamp-house through a series of small channels or ducts, d, made along the lower edge of the head-panel F of the end of the car. These ducts lead directly into the lamp-house in the rear of the reflectors, with the view that the air thus admitted may pass freely around and over the back of the reflectors, in order to keep them cool, and then pass into the lamp-chamber M proper.

Instead of having a number of ducts or channels, d, leading to the interior of the lamp-house, but one or two of larger size may be used; but it is preferred to have a greater number of smaller openings, as such yield a more regular and evenly-diffused supply of air to the chamber; and instead of such ducts or openings being formed in the end of the car, they may be formed and suitably arranged in the side wall of the car; but it is preferred to make them in the end wall, although both plans may be combined and used together with great advantage.

The reflectors are formed in three distinct parts, two side reflectors, G G, and one, H, in the center. The side reflectors G G are set at an angle to the central one, H, flaring outwardly, as shown in Fig. 5, while the central one, H, is set in a plane parallel with the end of the car.

The central reflector H is set in a frame, J, having flanges i, to which are secured small clutch-pieces m, into which are fitted the inner edges or sides of the two angularly-arranged side reflectors G G. The clutch-pieces m serve to steady and keep them in place, and at the same time to give free access to the air at their rear—i. e., between them and their angularly-arranged supporting-boards K, located at their rear.

Central reflector H, which, like the others, I prefer to make of plate or of common looking glass, has its frame J cut away, and the film of quicksilver amalgam removed from that portion of its surface immediately opposite the lamp-flame and the signal-lens L, so as to give free passage to the rays of light through the reflector-plate H to the lens L.

Lens L may be of any desirable construction, and may, for the purpose of varying the signals, be made of tinted glass of any required shade or color; or it may be a lens devoid of color; or it may be a lens devoid of color, but combined with a plate of tinted or colored glass, as may be desired.

In arranging and forming the ducts d, which supply air to the lamp-house, I prefer that they should consist of a series of small holes, instead of one, two, or three large ones, and that they should be made along the lower edge of the head-panel F, and that they should take such direction as will most effectually conduct the fresh outside atmosphere into the lamp-house, and so that it may freely enter the latter at or near its floor, and thus provide a bountiful supply to the lamp-flame.

For this purpose, if desired, the lower edge of the reflectors and their angularly-arranged supporting-boards K at their back may be raised slightly above the floor of the lamp-house, and only supported at their outer ends; or their lower edges may be niched to give free passage to the air.

The lower and upper ends of the frame J of the central reflector H may also be pierced with one or more series of holes, to give free passage to the air to the lamp-chamber.

In the bottom of the floor of the lamp-house, immediately opposite the lens, a depression is made, or an opening cut, to form a lodgment for the base or well of the lamp.

Where the opening is used, it is covered on its under side by a suitable device in any known way; but I prefer to use a metallic dish, $n$, with its concave side up, and on which is formed or secured, and of a size greater than that of the opening, a suitable flange, by which to secure it tightly to the under side of the lamp-house floor, and in such manner as to thoroughly and completely close the opening, so as to prevent all communication through that opening between the air in the lamp-chamber and the atmosphere on the inside of the car.

The door is also made to fit the frame of the lamp-house closely, that no air or gas may find passage from the lamp-house to the inside of the car.

For this purpose the door E is kept firmly closed by means of a suitable device, such as a staple, $o$, and hooks $o'$, applied in the manner substantially as shown in the drawings.

Great care must also be exercised in the construction of the lamp-house itself, that no communication may, through its joints, be maintained between the inside of the car and that of the lamp-house, save when the door of the latter is intentionally opened.

Thus constructed, the exhaustion of the air within the car will not, and cannot, affect the air within the lamp-house, and consequently the lamp-flame will remain undisturbed by any fluctuations of the atmosphere within the car, and hence will, from being provided with an ample and regular supply of fresh air from the outside of the car, cause the lamp-flame to burn with a steady and brilliant light.

The upper end of the smoke-stack $c^1$ proper is provided with a detachable cap-piece, consisting of a short stem, $c^2$, the upper end of which is provided with a cover, $c^3$, pierced with a number of small holes; or, if desired, it may be covered with wire-gauze. To this cap-piece $c^2$ is secured another cap-piece, $c^4$, by means of arms $c^5$, which support it in a plane in a line with, or slightly above, the top of cap $c^2$.

Cap-piece $c^4$ is cone-shaped, and is made of a width greater at its lower end than the diameter of cap-piece $c^2$.

By this construction it prevents ingress to rain, snow, &c., and the descent, also, of those sudden gusts of air down through the smoke-stack into the lamp-house which so frequently extinguish the lamp-flame. It also gives free vent to the products of combustion from the lamp.

Having described my invention, what I claim as new, and desire to secure by Letters Patent, is—

1. In combination with the lamp-chamber M of a lamp-house, a street-car provided with one or more ducts, channels, or openings, leading from the atmosphere outside of the car to the space around the lamp on the interior of the lamp-chamber, substantially as and for the purposes set forth.

2. In combination with the lamp-chamber M of a lamp-house, a street-car provided with one or more ducts, channels, or openings, $d$, arranged to lead from the external atmosphere to the space around the lamp on the interior of the lamp-chamber, at or near its floor-line, substantially as and for the purpose described.

3. A lamp-house provided with a smoke-stack for carrying off the gases generated by the lamp, in combination with a car provided with one or more ducts, channels, or openings leading from the atmosphere outside of the car to the space around the lamp on the interior of the lamp-chamber, in the manner substantially as and for the purpose set forth.

4. A lamp-house of a street-car, the bottom of which is constructed with a tight concavity, extending below the floor-line, to form a suitable lodgment for the lamp and provide space for use, in connection with the lamp, of a chimney of proper height to insure thorough combustion, substantially as described.

5. A lamp-house of a street-car, provided with a cavity in its floor, and a dish or receptacle for catching the oil-drip from the lamp, substantially as set forth.

6. A lamp-house provided with a lamp and a lens, glass, or other transparent device, through which the light from the lamp may be projected beyond the car for signaling purposes, and a smoke-stack for exhausting the lamp-chamber of the gases generated by the lamp, in combination with a car provided with one or more ducts, channels, or openings, which lead from the atmosphere outside of the car to the space around the lamp on the interior of the lamp-chamber, in the manner substantially as and for the purposes set forth.

7. A lamp-house provided with a lamp and mirrors arranged to reflect the light within the car, and with a smoke-stack for carrying off the gases generated by the lamp, in combination with a car provided with one or more ducts, channels, or openings, which lead from the atmosphere outside of the car to the space around the lamp on the interior of the lamp-chamber, in the manner substantially as and for the purposes set forth.

8. A street-car provided with one or more ducts, channels, or openings for supplying air to the lamp-house from the external atmosphere, in combination with a lamp-house constructed to admit the air to its interior from these openings at a point in the rear of the reflectors, for the purpose of keeping them cool, substantially as set forth.

9. A lamp-house arranged within the car, and constructed to prevent atmospheric communication between the lamp-chamber M and the interior of the car, save when the door is incidentally or intentionally opened, in combination with a car provided with one or more ducts, channels, or openings, $d$, arranged, substantially as described, to lead from the external atmosphere to the space around the lamp on the interior of the lamp-chamber, for the purposes set forth.

10. A lamp-house of a street car, in which the space around the lamp on the interior of the lamp-chamber M is supplied with air drawn from the outside of the car by means of one or more ducts or channels formed in the wall or walls of the car, in combination with a smoke-stack enlarged between the lamp-chamber and its discharge-opening, and in which enlargement is located a shield, $h$, of suitable shape, such as an inverted dish, to prevent downward rush of air to the lamp-chamber, substantially as set forth.

11. In combination with the chimney or smoke-stack of the lamp-house of a car, a cap-piece, $c^2$, provided with a series of small openings, and with a curved or cone-shaped supplemental cap, $c^4$, substantially as and for the purpose set forth.

12. A lamp-house provided with a shield, $h$, and a cap-piece, $c^2$, having a cover, $c^3$, provided with a number of small openings, and with a convex or conical cap-piece, $c^4$, substantially as set forth.

13. A lamp-house of a street-car, provided with pendent fingers $o$, to steady the top end of the glass chimney, and with a tight concavity in its bottom, to hold the lamp in place and catch the oil as it drips therefrom, substantially as set forth.

In testimony that I claim the foregoing as my own I affix my signature in presence of two witnesses.

JOHN STEPHENSON.

Witnesses:
  WILLIAM J. WALKER,
  JOHN SMITH.